July 1, 1930.    C. L. SNYDER ET AL    1,769,277
VEHICLE HOLDDOWN
Filed May 7, 1927    2 Sheets-Sheet 1

INVENTORS.
C. L. Snyder.
BY E. S. Evans.
ATTORNEY.

July 1, 1930.  C. L. SNYDER ET AL  1,769,277
VEHICLE HOLDDOWN
Filed May 7, 1927   2 Sheets-Sheet 2

INVENTORS
C. L. Snyder.
BY E. S. Evans.
ATTORNEY.

Patented July 1, 1930

1,769,277

UNITED STATES PATENT OFFICE

CLIFFORD L. SNYDER AND EDWARD S. EVANS, OF DETROIT, MICHIGAN, ASSIGNORS TO THE EVANS AUTO LOADING COMPANY, INC., A CORPORATION OF DELAWARE

VEHICLE HOLD-DOWN

Application filed May 7, 1927. Serial No. 189,706.

This invention relates to certain new and useful improvements in vehicle holddowns.

The primary object of this invention is to provide a holddown for vehicles in the form of an anchoring device for retaining the vehicle against movement during shipment and has been designed with a view of reducing the number of parts of a holddown of this general character and also for lessening the cost of manufacture.

Another object of the invention is to provide a holddown embodying a vehicle engaging part and an associated foot that is anchored to the car floor, the vehicle engaging part being in the form of a loop strap or the like fashioned for intimate contact with the engaged part of the vehicle and with the free ends of the vehicle engaged part detachably and adjustably engageable with the anchoring foot adjacent the floor to render the anchoring of the vehicle in position more accessible.

A further object of the invention is to provide a holddown of the above type wherein the anchoring foot is formed of resilient material so that when the vehicle engaged part of the holddown is attached to the anchoring foot, the desired tension or stress may be embodied in the hold down for the more perfect securement of the vehicle.

With the above and other objects in view and others that will appear as the nature of the invention is better understood, the same consists in the novel form, combination and arrangement of parts and in the details of construction hereinafter more fully described, shown in the accompanying drawing and claimed.

In the accompanying drawing, wherein like reference characters are employed to designate corresponding parts throughout the several views.

One of the principal features embodied in each form of the invention as herein disclosed is to construct a holddown for use in the shipment of vehicles of the minimum number of parts for the purpose of lessening the cost of manufacture but without, in any manner, disturbing the efficiency attributed to a device of this character. The holddown being constructed of two parts, the connection between the parts has been disposed in proximity of the floor and spaced from the vehicle to facilitate connection of the two parts in a minimum amount of time which results in the saving of labor and increased efficiency.

The vehicle engaged part of the holddown may be fashioned for intimate contact with the engaged part of the vehicle, and both of said holddown parts being, preferably formed of resilient material, tension thereof is primarily obtained by the adjustable nut connection between the two parts. During the tensioning of the anchoring foot, the same becomes slightly distorted which serves to prevent accidental unscrewing of the securing nut.

Figure 1:
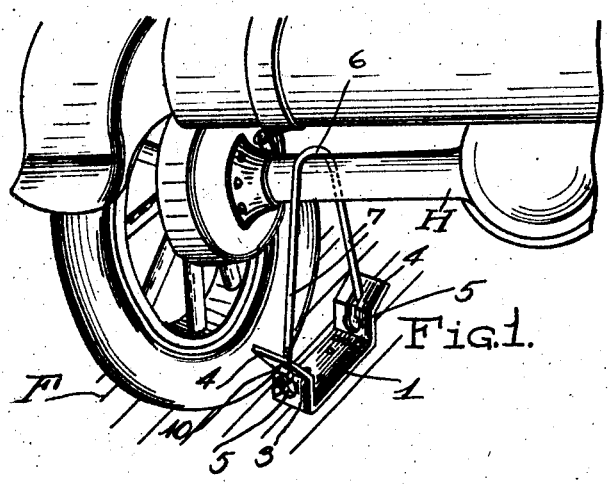
Figure 1 is a perspective view of the vehicle holddown constructed in accordance with the present invention, the vehicle engaging part of the holddown being illustrated as engaged with the rear axle housing.
Figure 2:
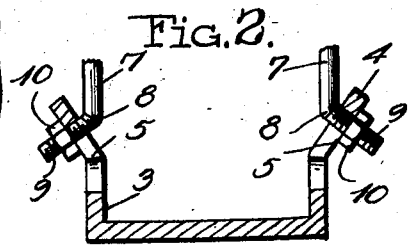
Figure 2 is a vertical longitudinal sectional view, partly broken away of the holddown shown in Fig. 1, the anchoring foot being of strap formation with perpendicular ends terminally inclined outwardly with key-hole slots in the ends of the foot.
Figure 3:
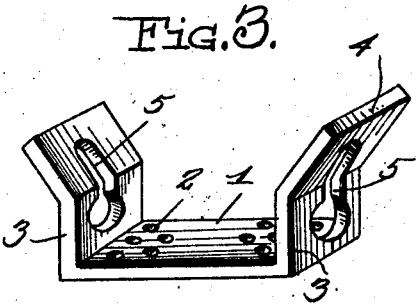
Figure 3 is a perspective view of the anchoring foot shown in Fig. 1.

In the form of the invention shown in Figures 1 to 3, the holddown comprises an anchoring foot 1 provided with a plurality of openings 2 intermediate the ends thereof for the passage of nails or the like to secure the foot to the floor F with the opposite ends of the anchoring foot bent upwardly and spaced from the floor to be engaged by the lower ends of the holddown rod. The foot 1 has the end portions thereof outwardly of the intermediate anchored portion bent perpendicularly upwardly as at 3 with outwardly inclined ends 4. The end portions 3 and 4 have key-hole shaped slots 5 formed therein, the larger ends of the slots being formed in the end portions 3 while the reduced ends thereof extend upwardly and terminate in the end portions 4.

Figure 8:
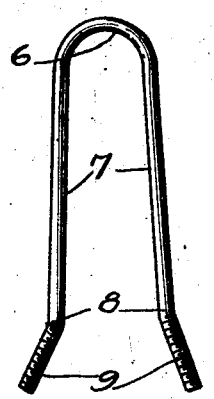
Figure 8 is a side elevational view of the vehicle engaged part or anchoring rod shown in Figure 1 with a curved loop connecting the side legs and with the threaded ends of the leg angularly bent outwardly.

The vehicle engaged part of the holddown as shown in Figs. 1 and 8 comprises a wire rod of inverted U-formation having the closed curved end loop 6 intimately engaged with the rear axle housing H or other part of the vehicle while the side legs 7 thereof extend downwardly and angularly bent outwardly at their lower ends as at 8 with the terminal end threaded as at 9. A nut 10 is threaded on the lower end 9 of each side leg 7 beneath the end portions 3 and 4 of the foot and upon tightening the nuts 10 upon the threaded ends 9 of the rod, the two parts of the holddown are placed under tension. It has been found preferable to first place the nuts 10 upon the lower threaded ends of the legs 7 with the lower ends of the legs thereafter inserted in the larger ends of the slots 5 and subsequently moved to the reduced ends thereof, and upon tightening the nuts, the holddown is placed under tension for the better securement of the vehicle. The ends of the side legs 7 being at the reduced upper ends of the slots, accidental displacement thereof is eliminated and the proper tension maintained with the two parts of the holddown securely connected together.

In the form of the invention shown in Figure 3, the end portion 3—4 of the anchoring feet are provided with central openings 5, through which the lower ends of the rods 7 extend and when the nuts 10 are threaded on the lower ends 9 of the rods, the tie down rod and anchoring foot are positively locked together.

Figure 4:
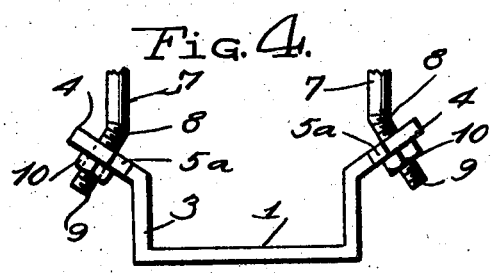
Figure 4 is a side elevational view of another form of anchoring foot similar to Figure 1 with the upstanding end portions of the foot disposed at an upward inclination with side opening bayonet-shaped slots to receive the lower ends of the legs of the anchoring rod, with the lower threaded ends of the legs bent outwardly.
Figure 5:
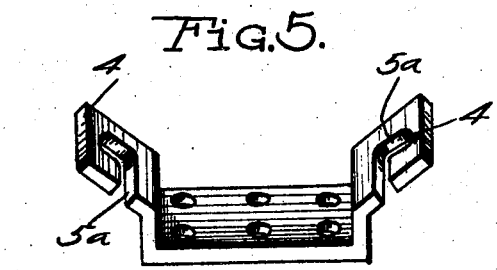
Figure 5 is a perspective view of the anchoring foot shown in Figure 4 and illustrating the bayonet slots in the upstanding ends of the anchoring foot.

In the form of the invention shown in Figures 4 and 5, the anchoring foot approaches the construction shown in Figures 1 and 2 except that the key-hole shaped slots are replaced by the side opening slots 5ᵃ that are of bayonet slot formation, and are formed in the terminal inclined ends 4. The holddown rod shown in Figure 8 with nuts 10 threaded thereon is introduced into the bayonet slots 5ᵃ through the open sides thereof. Upon tightening the nuts 10 to place the holddown foot and rod under tension, the terminal ends 4 and the bent ends of the holddown rod will have a tendency to straighten out to provide for greater tension.

Figure 6:
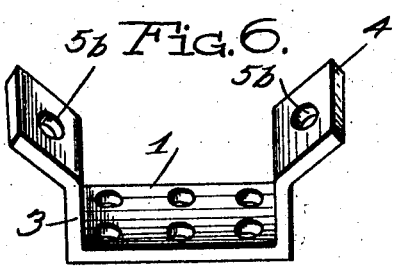
Figure 6 is a perspective view of another form of anchoring foot similar to Figure 5 with openings in the upstanding ends of the foot in lieu of the bayonet slots.

The type of anchoring foot disclosed in Figure 6 is defined from Figures 3 and 5 by the provision of circular openings 5ᵇ in the terminal ends 4 of the anchoring foot for the passage of the lower threaded ends of the vehicle engaged part, such as shown in Figures 1 and 8. In this form of the invention, the lower threaded ends 9 of the holddown rod are passed through the openings 5ᵇ with the nuts 10 thereafter threaded on the lower ends of the side legs of the holddown rod and upon tightening the nuts, the desired tension is attained.

Figure 7:
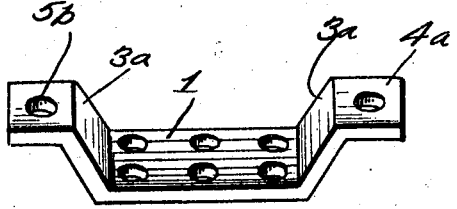
Figure 7 is a perspective view of another form of anchoring foot with the upstanding angle ends inclined outwardly and terminating in horizontal portions having openings therein.
Figure 9:
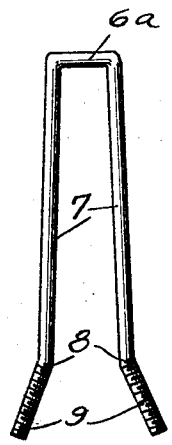
Figure 9 is a side elevational view of another form of anchoring rod showing a straight section connecting the side legs.
Figure 10:
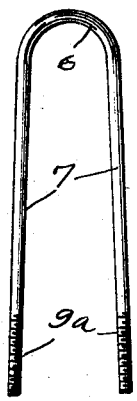
Figures 10 and 11 are side elevational views respectively, of anchoring rods showing curved and straight connecting portions for the side legs with the lower threaded ends of the leg coextensive with the remaining portions.
Figure 11:
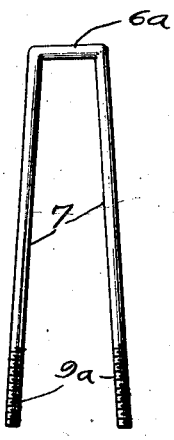
Figure 12:
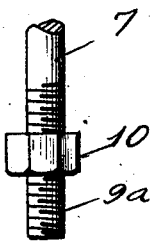
Figure 12 is a fragmentary elevational view of the anchoring rod showing the lower threaded end with a nut thereon.

The holddown foot shown in Figure 7 comprises the central base portion 1 with the upstanding ends 3ᵃ inclined outwardly and terminating in horizontal ends 4ᵃ in which openings 5ᵇ are formed for the passage of the lower ends of the holddown legs. With this form of foot, either of the vehicle engaged parts as shown in Figures 10 and 11 is adapted to be connected, the threaded ends 9ᵃ of the side legs of the holddown part being coextensive with said legs, the curved connecting loop of the side legs of the holddown part shown in Figure 10 being adapted for enclosing the rear axle housing of a vehicle or a similarly curved part, while the straight connecting rod section 6ᵃ for the side legs as shown in Figure 11 is adapted for association with a vehicle spring or similarly shaped part. Figure 9 shows a part similar to Figure 8 with the connecting portion for the side legs represented by a straight arm 6ᵃ.

Figure 13:
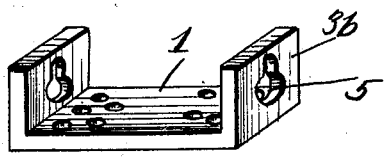
Figure 13 is a perspective view of another form of anchoring foot showing perpendicular ends having key-hole slots therein.

Another form of anchoring foot is shown in Figure 13, the base portion 1 of the anchoring foot having perpendicular ends 3ᵇ in which key-hole shaped slots 5 are formed and the type of vehicle engaged part shown in Figures 8 and 9 may be selectively employed therewith.

Figure 14:
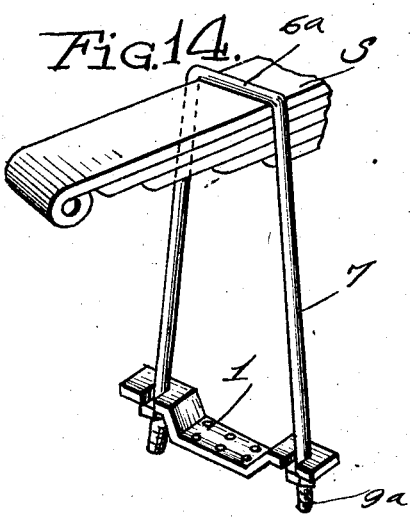
Figure 14 is a perspective view of another form of anchoring foot with the vehicle engaged foot shown in Fig. 11 engaged therewith and inclosing a vehicle spring.
Figure 15:
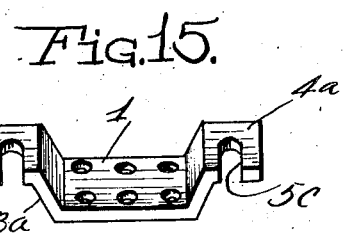
Figure 15 is a perspective view of the anchoring foot shown in Figure 14.

The vehicle engaged part shown in Figure 11 as illustrated in Figure 14 as engaged with the spring S of the vehicle, while another form of anchoring foot is disclosed in these figures. This form of foot is similar to the foot shown in Figure 7, the horizontal terminal end 4ᵃ of the foot having a side opening slot 5ᶜ with the lower ends of the side legs of the vehicle engaged part introduced laterally into the slot. The foot is placed under the desired tension by tightening the nuts upon the lower threaded ends of the rod.

From the above detailed description of each form of the invention, it is believed that the construction and operation of the invention will be clearly apparent, the principal features of the invention embodying a vehicle engaged part that is adapted for intermittent contact with the engaged part of the vehicle and an anchoring foot formed of resilient material so that when the two parts of the holddown are connected in the manner as above described, the entire holddown is placed under tension for the more perfect securement of the vehicle during shipment, and while there are herein shown and described the preferred embodiments of the present invention, it is nevertheless to be understood that minor changes may be made therein without departing from the spirit and scope of the invention as claimed.

What we claim as new is:—

1. In a holddown of the type described, a foot adapted to be anchored to a floor or other support and having raised end portions and a holddown of inverted U-shape having side legs attached at their ends, respectively, to the opposite raised end portions of the foot.

2. In a holddown of the type described, a foot adapted to be anchored to a floor or other support and having raised end portions and a holddown of inverted U-shape having side legs attached at their ends, respectively, to the opposite raised end portions of the foot, said foot being formed of resilient metal with the raised end portions angularly disposed relative to the anchored base portion whereby the holddown is placed under tension when attached to the foot.

3. In a holddown of the type described, a foot adapted to be anchored to a floor or other support and having raised end portions and a holddown of inverted U-shape having side legs attached at their ends, respectively, to the opposite raised end portions of the foot, the connection between the foot and holddown legs including the provision of slots in the raised end portions having entrance and retaining ends for the legs.

4. In a holddown of the type described, a foot adapted to be anchored to a floor or other support and having raised end portions and a holddown of inverted U-shape having side legs attached at their ends, respectively to the opposite raised end portions of the foot, the raised end portions of the foot including perpendicular ends with outwardly inclined terminal portions, and the connection between the foot and holddown legs including the provision of slots in the raised end portions having entrance ends in the perpendicular ends of the foot and retaining ends in the inclined portions.

In testimony whereof we affix our signatures.

CLIFFORD L. SNYDER.
EDWARD S. EVANS.